United States Patent
Enoki et al.

(10) Patent No.: US 7,864,666 B2
(45) Date of Patent: Jan. 4, 2011

(54) COMMUNICATION CONTROL APPARATUS, METHOD AND PROGRAM THEREOF

(75) Inventors: Tooru Enoki, Fukuoka (JP); Yasuo Inoue, Fukuoka (JP); Shinichi Hayashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 11/970,973

(22) Filed: Jan. 8, 2008

(65) Prior Publication Data

US 2008/0170494 A1 Jul. 17, 2008

(51) Int. Cl.
*H04J 1/16* (2006.01)
(52) U.S. Cl. .................. 370/216; 370/237; 370/389
(58) Field of Classification Search .............. 370/216, 370/389, 217, 221, 225, 227, 228, 242, 248
See application file for complete search history.

(56) References Cited

U.S. PATENT DOCUMENTS

| | | | |
|---|---|---|---|
| 5,963,540 A * | 10/1999 | Bhaskaran | 370/218 |
| 6,901,048 B1 * | 5/2005 | Wang et al. | 370/228 |
| 7,230,913 B1 * | 6/2007 | Vasseur et al. | 370/216 |
| 7,292,535 B2 * | 11/2007 | Folkes et al. | 370/238 |
| 2006/0013127 A1 * | 1/2006 | Izaiku et al. | 370/225 |

FOREIGN PATENT DOCUMENTS

JP    2004-357194    12/2004

* cited by examiner

*Primary Examiner*—Brenda Pham
(74) *Attorney, Agent, or Firm*—Staas & Halsey LLP

(57) ABSTRACT

A communication apparatus communicably connects a network of a plurality of apparatuses and a data relay apparatus to another network of the same manner as that of the network by detecting a failure occurring in the network, and determining a detour to assure communication between an apparatus connected to a network disconnected due to the failure detected and the other network. A tunneling is established serving as a virtual direct communication circuit to the determined detour.

9 Claims, 10 Drawing Sheets

COMMUNICATION CONTROL APPARATUS, METHOD AND PROGRAM THEREOF

CROSS-REFERENCE TO RELATED APPLICATIONS

This application is related to and claims priority to Japanese patent application no. 2007-5179 filed on Jan. 12, 2007 in the Japan Patent Office, and incorporated by reference herein.

BACKGROUND

Field

The embodiments relate to a communication control apparatus, method, and program thereof which causes a computer to execute a method of communicably connecting a network containing a plurality of apparatuses and a data relay apparatus to another network of the same manner as that of the network to each other.

SUMMARY

According to an aspect of an embodiment, there is provided a communication control apparatus which communicably connects a network containing a plurality of apparatuses and a data relay apparatus to another network of the same manner as that of the network to each other.

The communication apparatus includes a failure detection unit which detects a failure occurring in the corresponding network; a detour determination unit which determines a detour to assure communication between an apparatus connected to a network interrupted by a failure detected by the failure detection unit and the other network; and a tunneling establishing unit which establishes tunneling serving as a virtual direct-coupled communication circuit for a detour determined by the detour determination unit.

These together with other aspects and advantages which will be subsequently apparent, reside in the details of construction and operation as more fully hereinafter described and claimed, reference being had to the accompanying drawings forming a part hereof wherein like numerals refer to like parts throughout.

DETAILED DESCRIPTION OF THE PREFERRED EMBODIMENTS

As a method of assuring redundancy when a communication packet is transmitted to a node of an external network, a communication system having a network configuration in which two routers are connected to each node on the network is provided.

In the communication system, in order to efficiently operate two redundant routers to be connected, a VRRP protocol (Virtual Router Redundancy Protocol) is generally used. However, in a communication system using the VRRP protocol, when line disconnection occurs in a local network to which a redundant router is connected, a phenomenon in which some nodes cannot reach the network occurs.

Therefore, various techniques, which make it possible to all nodes to communicate even though line disconnection occurs in the local network, are known.

Figure 9:
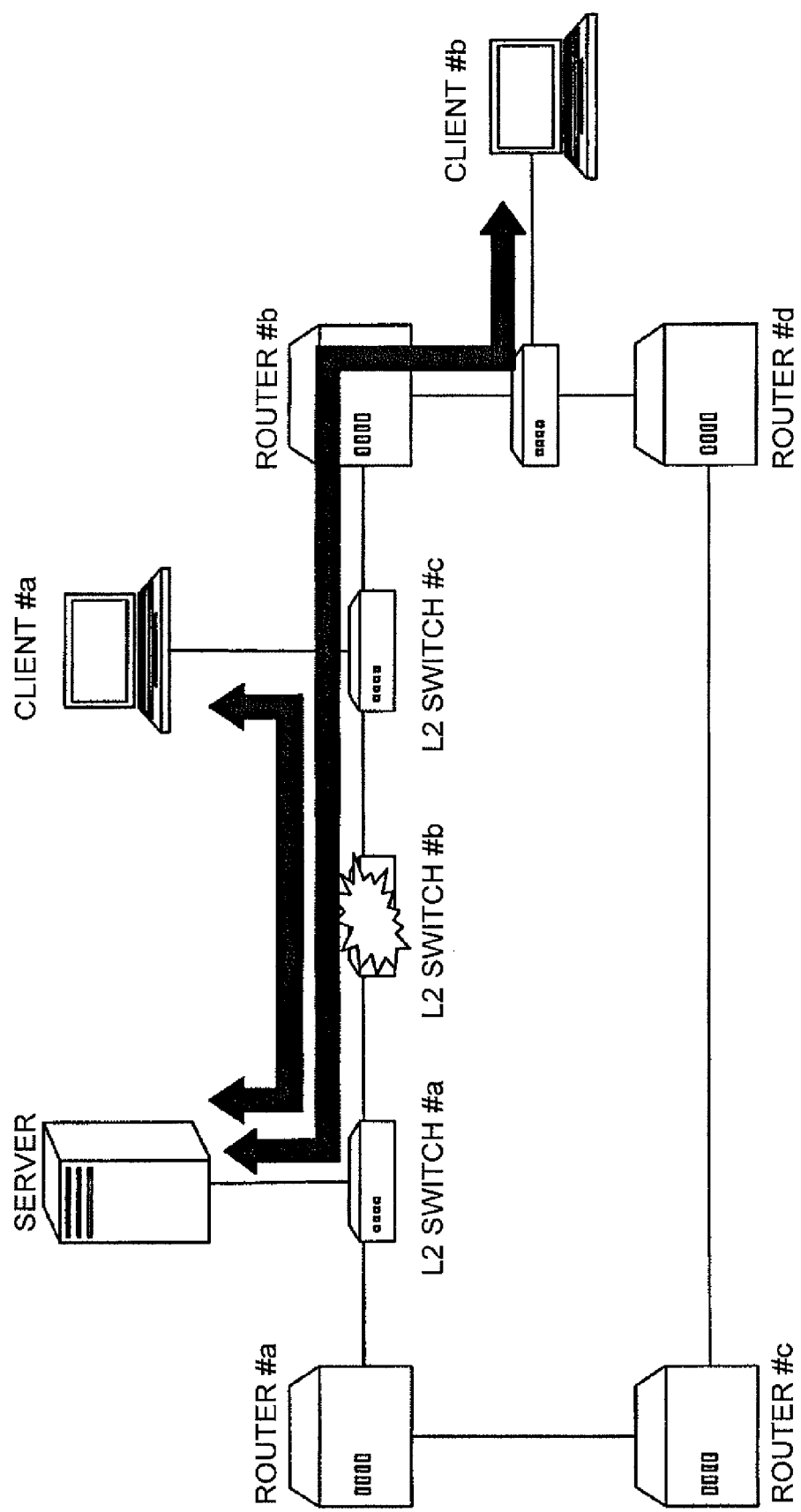
FIG. 9 is a diagram explaining a prior art.
Figure 10:
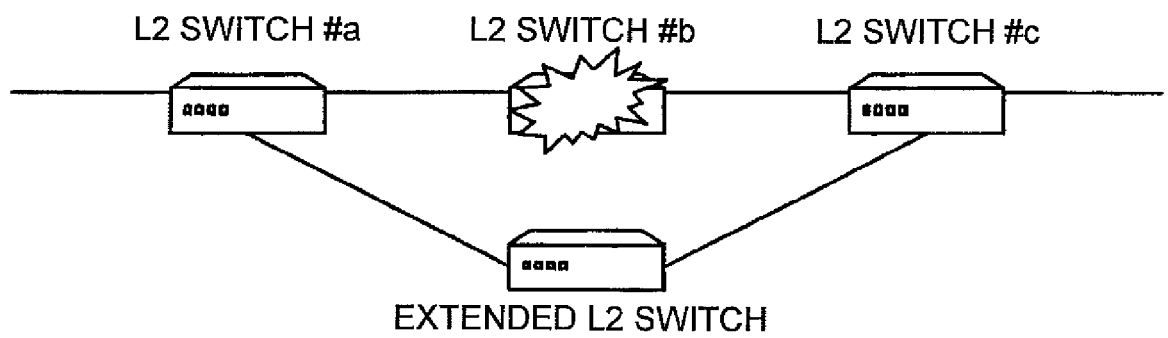
FIG. 10 is a diagram explaining a prior art.

In general, a switching hub is added to assure a detour. For example, in a network shown in FIG. 9, when a switching hub #b is broken down due to an apparatus failure, communication (packet) passing through the switching hub (i.e., mutual communication between a client #a and a server, communication from a client #b to the server, communication from the server to the client #b, and the like) become impossible. Therefore, as shown in FIG. 10, a switching hub is added to assure a detour.

There is a technique in which, when a line failure or an apparatus failure occurs in a relay apparatus, such as any router connected to the network, to make communication impossible, all the relay apparatuses (all routers) in the network are notified of a detour route (detour) to assure the detour route.

However, the above technique disadvantageously increases the introduction cost. More specifically, upon addition of a switching hub, a network loop is generated and a spanning tree protocol (STP) must be operated in all switching hubs arranged in the same network. As a result, it requires an expensive switching hub to operate the STP, therefore the introduction cost increases.

In the above technique, a large amount of resource of a routing table is consumed, and it takes a disadvantageously long time to stabilize a network. More specifically, since not only a relay apparatus (router) connected to a failed sub-network but also all the relay apparatuses are notified of a host route, when failures simultaneously occur in a plurality of sub-networks, the relay apparatuses are notified of a large amount of data (host routers). As a result, a large amount of resource of the routing table is consumed, and it takes a long time to stabilize a network. For example, when a failure occurs in a sub-network having a sub-net mask length of 24, the relay apparatuses are notified of $2^8=256$ host routes.

Therefore, the embodiments provide a communication control program which makes it possible to reduce a cost for assuring a detour, to prevent a resource of a routing table from being consumed, and to stabilize a network in a short period of time.

Main terms used in the following embodiments, an outline and characteristic features of a communication control apparatus according to a first embodiment, a configuration and a procedure of the communication control apparatus according to the first embodiment, and an effect of the first embodiment will be sequentially described, and then other embodiments will be described.

First Embodiment

Explanation of Terms

First, the main terms used in this embodiment will be described. A "router (corresponding to a "communication control apparatus" described in scope of claims)" used in the embodiment is an apparatus which relays data flowing on a network to another network. More specifically, the communication control apparatus includes a route selecting function (routing function), which determines a route by which data is to be transferred with reference to a received IP address (Internet Protocol) and a plurality of ports (LAN interfaces: Local Area Network Interfaces) to relay data between different networks and connect the different networks to each other When the router receives a broadcast packet generated from an arbitrary host (apparatus), an IP address and a MAC address (Media Access Control Address) of the source are associated with each other to form an ARP table (Address Resolution Protocol). When the data is relayed as described above, the router, with reference to the ARP table, rewrites a MAC address of a destination of the received data with that of the next router or the host (apparatus) and also rewrites a MAC address of the source with a MAC address of the router itself to relay the data.

The "switching hub (corresponding to a "data relay apparatus")" used in the embodiment is one of network relay apparatuses. That is, an apparatus such as a switching hub which determines a destination of a packet to transfer the packet. On a network, various protocols such as an IP address and a TCP (Transmission Control Protocol) are used. However, the switching hub can be used without being aware of a difference between the protocols. When a packet is received, a switching hub to assure a communication path on the network is called as a MAC learning switching hub, by making an IP address and a MAC address of the source and a receiving port be associated with each other and stored as a MAC learning table.

Further, "Tunneling" is a technique to establish a closed virtual direct communication line connecting arbitrary apparatuses to each other on a network such as the Internet. Both an Level 2 (L2) tunnel and a Level 3 (L3) tunnel used in the embodiment are techniques which establish closed virtual direct communication lines connecting arbitrary apparatuses to each other. However, the L2 tunnel can be used without being aware of a difference between protocols, and all packets in the arbitrary apparatuses can be relayed.

Outline and Characteristic Features of Communication Control Apparatus (router)

Figure 1:
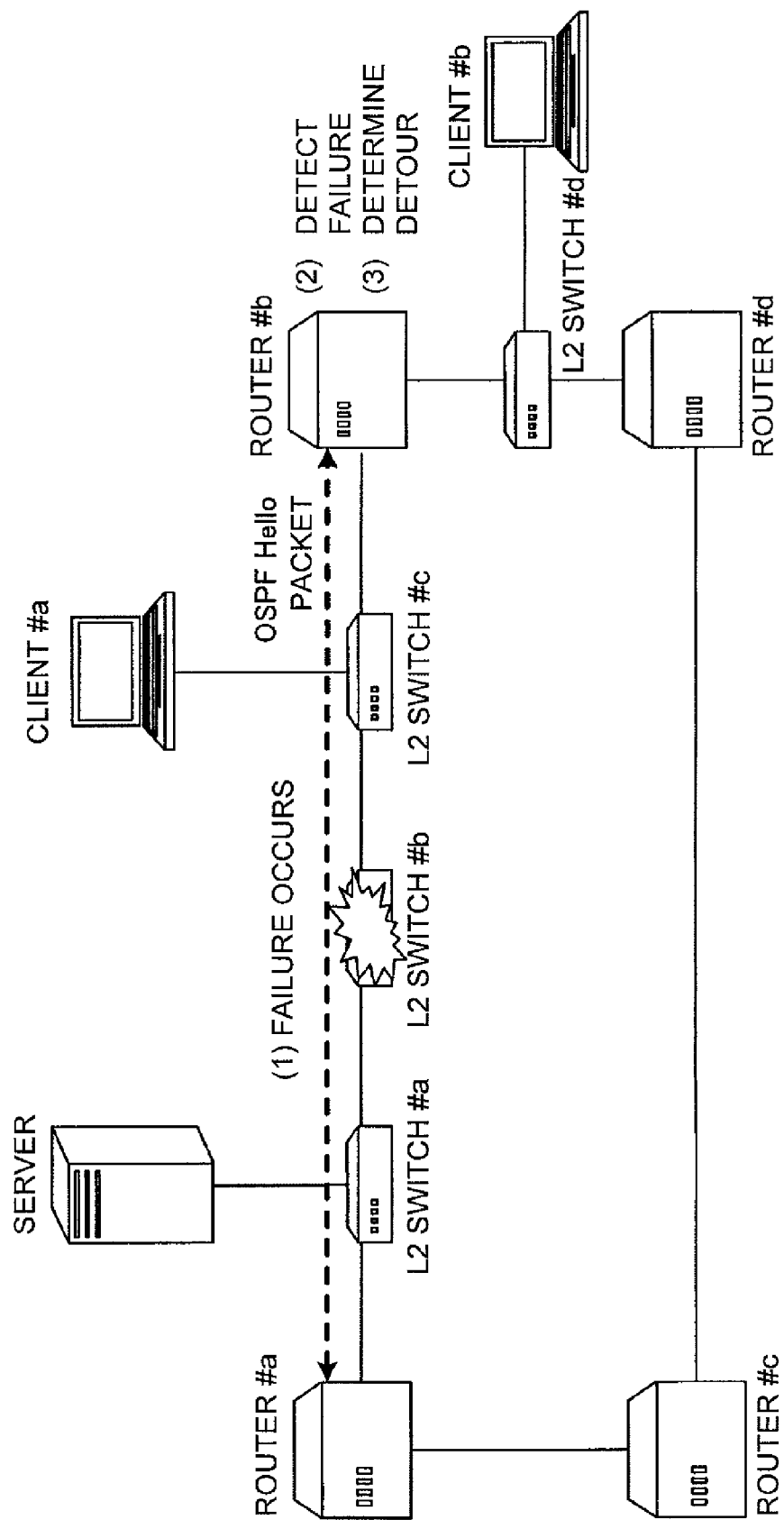
FIG. 1 is a diagram explaining an entire configuration of a system including a communication control apparatus (router) according to a first embodiment.
Figure 2:
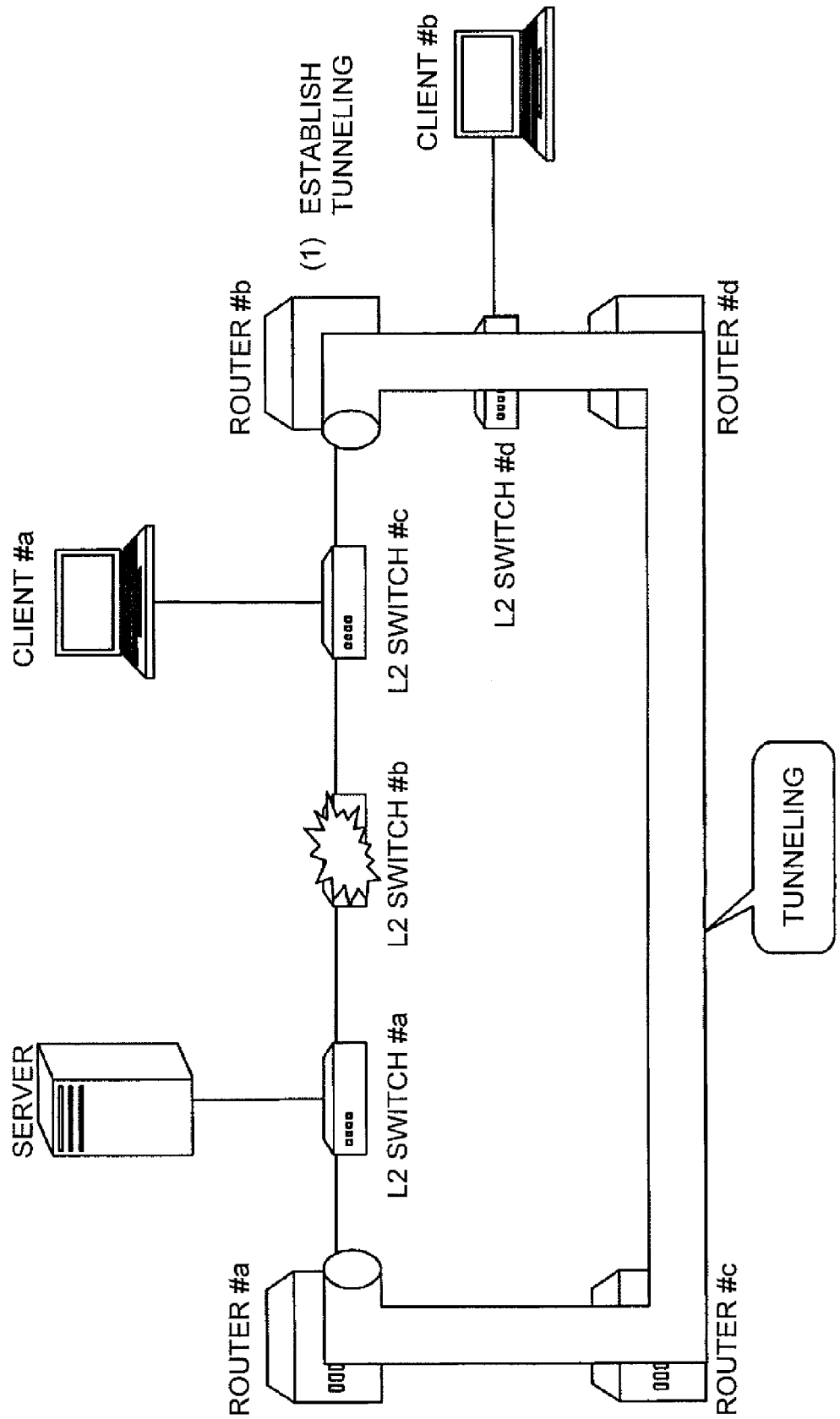
FIG. 2 is a diagram of tunneling in the system including the communication control apparatus (router) according to the first embodiment.

An outline and characteristic features of the communication control apparatus (router) according to the first embodiment will be described below with reference to FIGS. 1 and 2. FIGS. 1 and 2 are diagrams for explaining an entire configuration of a system according to the communication control apparatus (router), including tunneling, according to the first embodiment.

As shown in FIG. 1, in this system, routers #a to #d are communicably connected to each other.

A switching hub #a to which a server is connected, a switching hub #c to which a client #a is connected, and a switching hub #b which connects the switching hub #a and the switching hub #c are connected between the router #a and the router #b.

These switching hubs #a, #b and #c correspond to a sub-network in the network of the system.

A switching hub #d to which the client #b is connected is connected between the router #b and the router #d, and can be referred to as another network or another sub-network in the network of the system.

The router #a and the router #b operate an OSPF protocol (Open Shortest Path First Protocol) and transmit an OSPF packet to each other. The router #a and the router #b periodically receive OSPF Hello packets from the opposite routers to determine that a sub-network between the corresponding router and the opposite router is in a normally communicable state.

Based upon this configuration, the outline of the router according to the first embodiment, as described above, is to communicably connect to each other a network containing a plurality of apparatuses (server and client #a) and a switching hub to another network of the same manner as that of the network. In particular, the main characteristic features of the communication control apparatus are to reduce the cost of assuring a detour, to prevent a resource of a routing table from being consumed, and to stabilize a network within a short period of time.

The main characteristic features will be described below. The router #b transmits an OSPF packet to the router #a which connects the sub-network and another network. If the router #b does not receive a response to the OSPF packet from the router #a, the router #b detects that a failure occurs in the sub-network (see (1) and (2) in FIG. 1).

More specifically, in the switching hub #b, if a failure occurs due to defective hardware or port bad connection, the router #b cannot receive a response to an OSPF Hello packet periodically transmitted to the router #a from the router #b. When the router #b cannot receive the response, the router #b detects that a failure occurs in a sub-network between the router #b and the router #a. Because of the failure, a communication between the client #b and the server, and between the client #a and the sever cannot be established.

The router #b determines a detour to assure communication between an apparatus connected to the network disconnected by the detected failure and another network on the basis of a routing table calculated by an SPF (Shortest Path First) tree in the OSPF protocol (see (3) in FIG. 1).

More specifically, in general, when the router #b receives a packet transmitted from the client #b to the server, the router #b transfers the packet to the server through the switching hubs #c to #a. However, since communication between the switching hubs #c to #a is impossible due to the failure in the switching hub #b, the router #b determines a "route passing through the router #d, the router #c, and the router #a" through which communication between the client #b and the server can be established as a detour on the basis of an SPF tree generated from information of a topology table.

FIG. 2 is a diagram of tunneling in the system including the communication control apparatus (router) according to the first embodiment. In FIG. 2, the router #b then establishes tunneling, as a virtual direct communication circuit, corresponding to a layer 2 serving as a data link layer or a layer 3 serving as a network layer, to the determined detour (see (1) in FIG. 2). As will be described in detail below with reference to the above example, when the router #b receives a packet addressed to a server, the router #b adds a new IP header to the packet and establishes tunneling such as a VPN (Virtual Private Network) corresponding to the layer 2 serving as the data link layer or the layer 3 serving as the network layer to transfer the packet through "the router #d, the router #c, and the router #a" serving as the determined detour.

In this manner, the router #b according to the first embodiment can detour a sub-network in which a failure occurs to make it possible to assure communication between an apparatus connected to the sub-network and another network. As a result, as in the main characteristic features, the cost for assuring a detour can be reduced, a resource of a routing table can be prevented from being consumed by not notifying all the relay apparatuses of a detour route, and a network can be stabilized within a short period of time.

Configuration of Communication Control Apparatus (Router)

Figure 3:
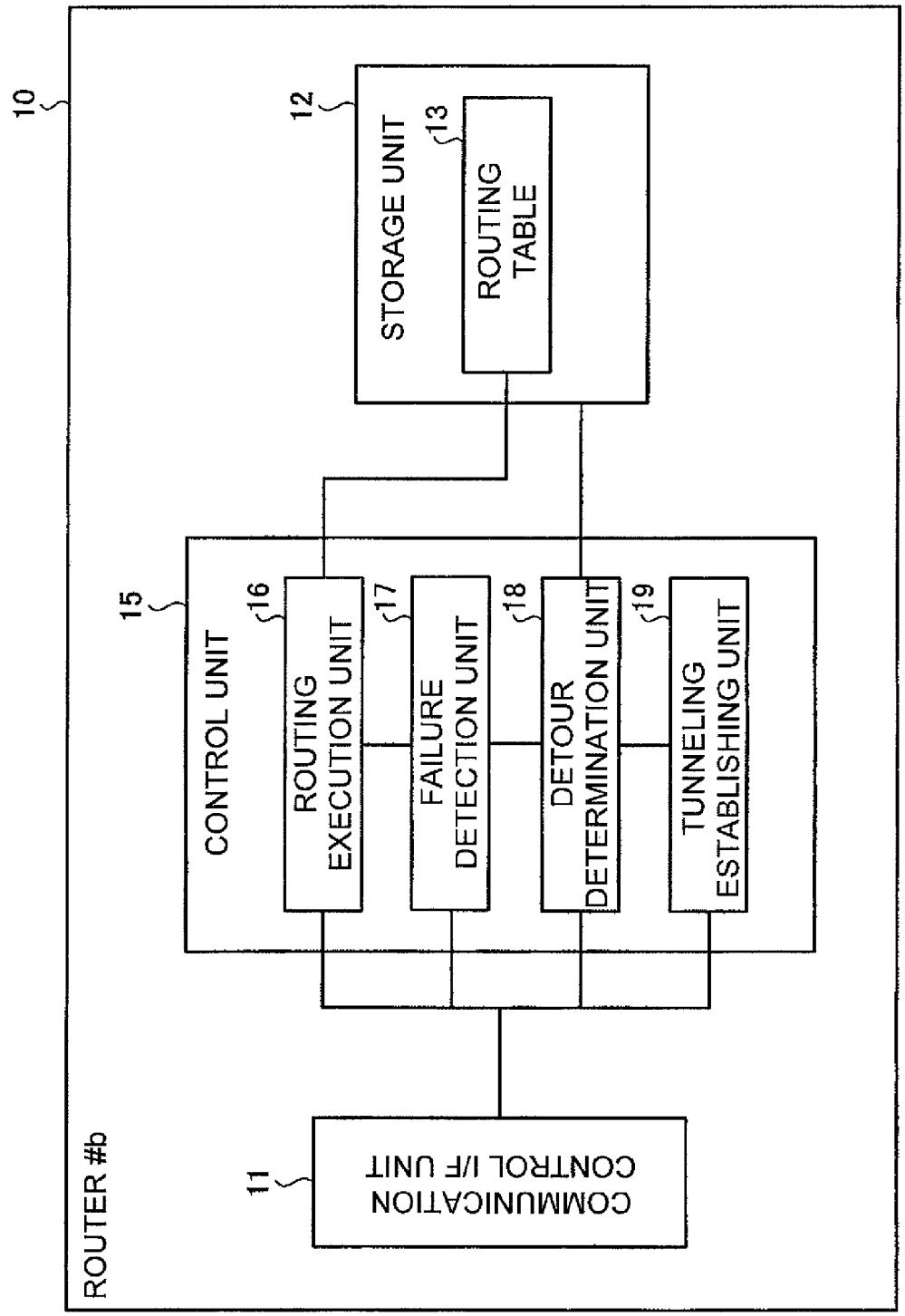
FIG. 3 is a block diagram showing a configuration of a communication control apparatus (router #b) according to the first embodiment.

A configuration of the router #b in the system shown in FIGS. 1 and 2 will be described below with reference to FIG. 3. FIG. 3 is a block diagram showing a configuration of the communication control apparatus (router #b) according to the first embodiment. Since the routers #a to #d have the same functions, an explanation about the router #b will be made.

As shown in FIG. 3, a router #b 10 includes a communication control I/F unit 11, a storage unit 12, and a control unit 15. The communication control I/F unit 11 controls communication about various pieces of information exchanged between the communication control I/F unit 11 and another apparatus. More specifically, the communication control I/F unit transmits/receives an OSPF Hello packet with the router #a and the router #d, receives a packet from the client #b, or transmits a packet to the client #b.

The storage unit 12 stores data and a program required for various processes performed by the control unit 15, and especially includes a routing table 13 according to an embodiment. The routing table 13 stores route information in the router #b. More specifically, the routing table 13 stores, for example, the following information: the router #a is connected to a port 1 of the router #b, a router #d is connected to a port 2 of the router #b, and, when a packet addressed to the client #b or to the server is received, the packet is output (transferred) from the port 1.

The control unit 15 has an internal memory to store a control program such as an OS (Operating System), a program which regulates various procedures or the like, and required data. According to an aspect of an embodiment, the control unit 15 especially includes a routing execution unit 16, a failure detection unit 17, a detour determination unit 18, and a tunneling establishing unit 19. The control unit 15 is a processing unit which executes various processes by using these units.

The routing execution unit 16 transfers a packet on the basis of the route information stored in the routing table 13. To cite a concrete case, when the routing execution unit 16 receives a packet addressed to the server or the client #a, the routing execution unit 16 outputs (transfers) the packet from the port 1 on the basis of the routing table 13. Also, when the routing execution unit 16 receives a packet addressed to the client #b, the routing execution unit 16 outputs (transfers) the packet from the port 2 on the basis of the routing table 13. That is, the routing execution unit 16 transfers a packet on the basis of the route information stored in the routing table 13.

The failure detection unit 17 transfers an OSPF packet to the router #a which connects a sub-network and another network. When the failure detection unit 17 does not receive a response to the OSPF packet from the router #a, the failure detection unit 17 detects that a failure occurs in the sub-network. To cite a concrete case, the router #a and the router #b operate an OSPF protocol and mutually transmit an OSPF packet. The router #b cannot receive a response to the OSPF Hello packet periodically transmitted to the router #a from the router #b if a failure occurs in the switching hub #b due to defective hardware or port bad connection. When the router #b cannot receive the response, the router #b detects that a failure occurs in a sub-network between the router #b and the router #a. The failure detection unit 17 corresponds to a "failure detection procedure" described in scope of claims.

The detour determination unit 18 determines a detour to assure communication between an apparatus connected to a network disconnected by a detected failure and another network on the basis of a routing table calculated by an SPF tree in the OSPF protocol. As will be described in detail below with reference to the above example, in general, when the router #b receives a packet transmitted from the client #b to the server, the router #b transfers the packet to the server through the switching hubs #c to #a. However, since communication between the switching hub #c and the switching hub #a is impossible due to the failure in the switching hub #b, the router #b determines a "route passing through the router #d, the router #c, and the router #a" through which communication between the client #b and the server can be established as a detour on the basis of an SPF tree (Shortest Path First) generated from information of a topology table.

This SPF tree is to automatically generate connection among apparatuses containing the network as shown in FIG. 1 from a stored routing tree or transmitting/receiving information of an OSPF packet. The router #b determines a detour on the basis of an automatically generated configuration diagram (for example, a topology or the like). The detour determination unit 18 corresponds to a "detour determination procedure" described in scope of claims.

The tunneling establishing unit 19 establishes tunneling, as a virtual direct communication circuit, corresponding to a layer 2 serving as a data link layer or a layer 3 serving as a network layer to the determined detour. As will be described in detail below with reference to the above example, when the router #b receives a packet addressed to the server, the router #b adds a new IP header to the packet and establishes tunneling, such as a VPN (Virtual Private Network) corresponding to the layer 2 serving as the data link layer or the layer 3 serving as the network layer, to transfer the packet through "the router #d, the router #c, and the router #a" serving as the determined detour. The tunneling establishing unit 19 corresponds to a "tunneling establishing procedure" described in scope of claims.

Process by Communication Control Apparatus (Router #b)

Figure 4:
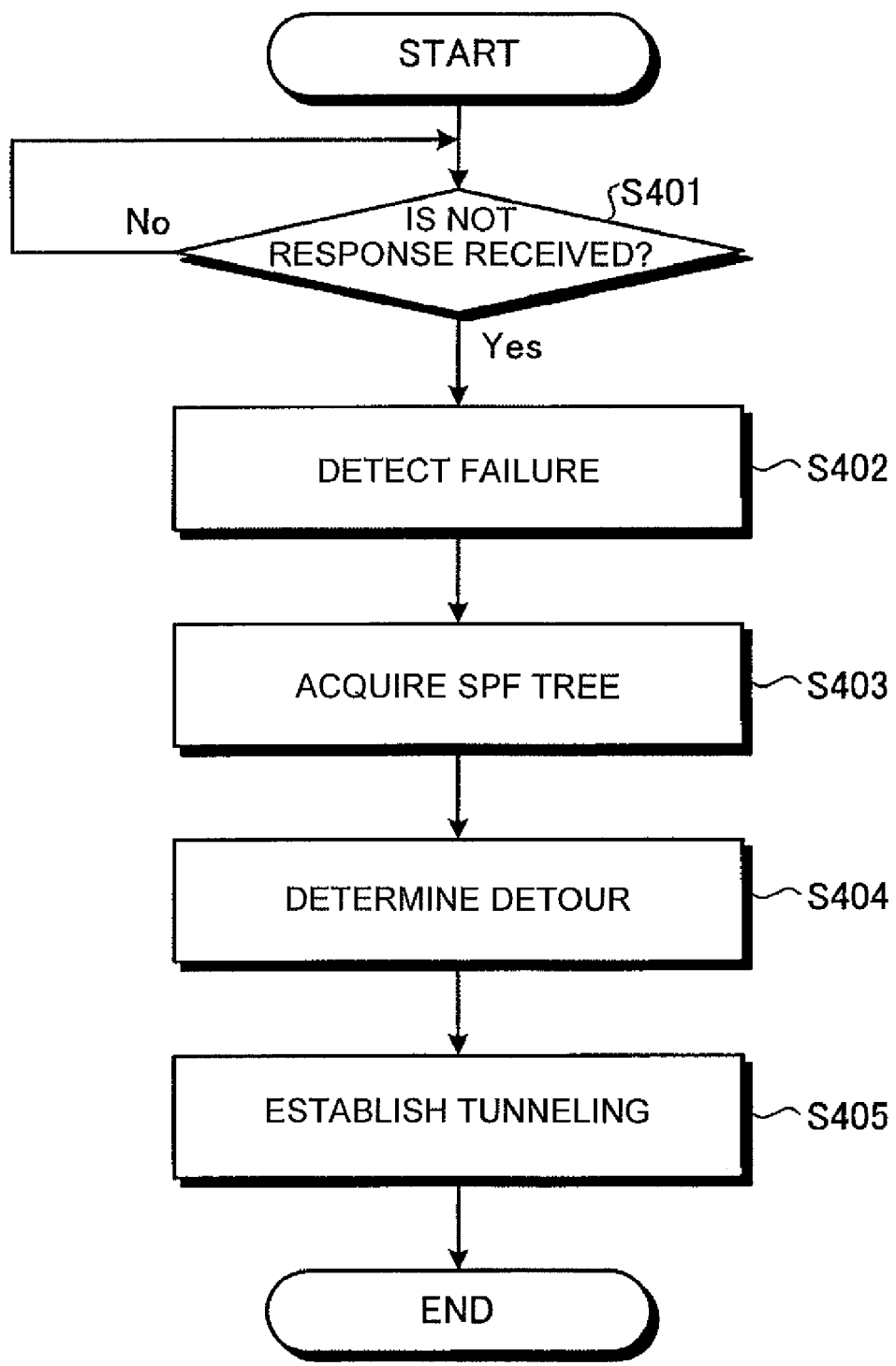
FIG. 4 is a flow chart showing a flow of a detour establishing process in the communication control apparatus (router #b) according to the first embodiment.

A process by the router #b will be described below with reference to FIG. 4. FIG. 4 is a flow chart showing a flow of a detour establishing process in the communication control apparatus (router #b) according to the first embodiment.

As shown in FIG. 4, the router #b transmits an OSPF packet to the router #a which connects a sub-network and another network. When the router #b does not receive a response to the OSPF packet from the router #a (Yes in S401), the router #b detects that a failure occurs in the sub-network (S402).

The router #b acquires an SPF tree in an OSPF protocol (S403) and determines a detour to assure communication between an apparatus connected to a network disconnected due to the detected failure and another network on the basis of a routing table calculated by the acquired SPF tree (S404).

Subsequently, the router #b establishes tunneling, as a virtual direct communication circuit, corresponding to a layer 2 serving as a data link layer or a layer 3 serving as a network layer, to the determined detour (S405).

In this manner, according to the first embodiment, a failure occurring in a network is detected, a detour to assure communication between an apparatus connected to a network disconnected due to the detected failure and another network is established, and tunneling serving as a virtual direct communication circuit is established to the determined detour. For this reason, the cost for assuring a detour can be reduced, a resource of a routing table can be prevented from being consumed, and a network can be stabilized within a short period of time.

For example, when a failure occurs in a switching hub containing a sub-network to interrupt communication, even though an inexpensive switching hub which cannot operate a spanning tree protocol is used, a detour can be assured to make it possible to establish communication. As a result, the cost for assuring the detour can be reduced. Since a detour is determined to establish tunneling to only an L2 switch or a router connected to the network in which the failure occurs, a resource of a routing table can be prevented from being consumed. Since the tunneling is established to only the L2 switch or the router connected to the network in which the failure occurs, any process is not required for an uninfluenced router or the like. As a result, the network can be stabilized for a short period of time.

According to the first embodiment, in a case that an OSPF packet is transmitted to the router #a which connects a sub-network and another network, and a response to the OSPF packet is not received from the router #a, the failure can be reliably detected since it is detected that a failure occurs in the sub-network.

For example, when an OSPF Hello packet is transmitted to a router containing a network, and when a response to the packet is not received, it is detected that a failure occurs. As a result, it can be reliably detected whether a failure occurs in the network, a switching hub, or the like.

According to the first embodiment, since tunneling corresponding to a layer 2 serving as a data link layer or a layer 3 serving as a network layer is established as a virtual direct communication circuit, it enables to ensure communication with precision by use of a detour.

For example, an L2 tunnel is established to make it possible to correctly detour a packet to all apparatuses connected to a disconnected network. Furthermore, an L3 tunnel is established to make it possible to correctly detour a packet between routers.

Second Embodiment

In the explanation of the first embodiment, when a router #b does not receive a response to a transmitted OSPF Hello packet, it is detected that a failure occurs in a sub-network. However, the present invention is not limited to this configuration and the router #b may detect that a failure occurs in the sub-network, when the router #b transmits an ICMP packet and does not receive a response to the ICMP packet.

In the second embodiment, a case in which, when the router #b transmits an ICMP packet to a router #a and does not receive a response to the ICMP packet, it is detected that a failure occurs in the sub-network will be described. In the following description, a procedure of a process in a communication control apparatus (router #b) according to the first embodiment and an effect of the second embodiment will be described.

Process (Second Embodiment) by Communication Control Apparatus (Router b)

Figure 5:
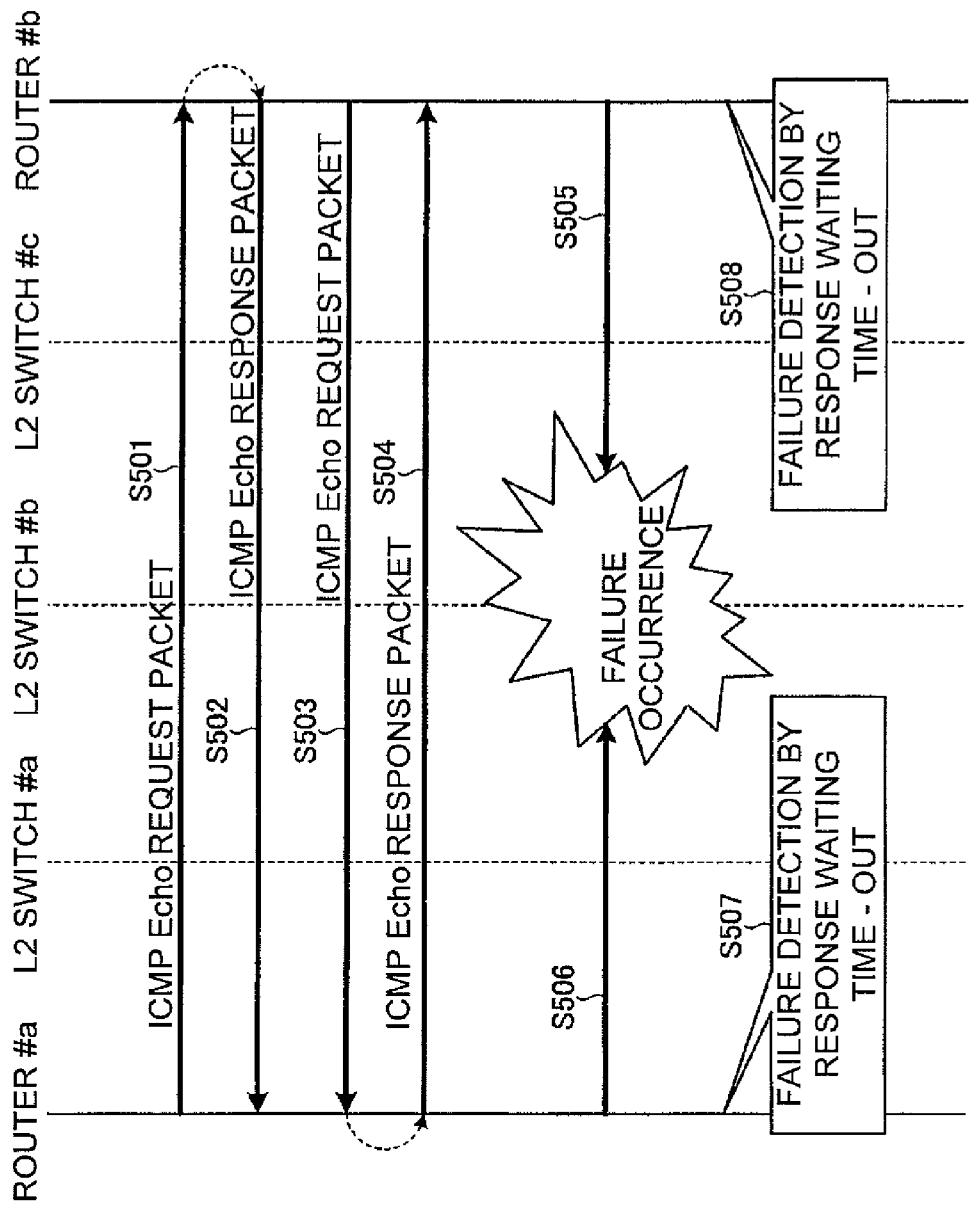
FIG. 5 is a sequence diagram showing a flow of a failure detection process in a communication control apparatus (router) according to a second embodiment.

A process by the communication control apparatus (router) will be described with reference to FIG. 5. FIG. 5 is a sequence chart showing a flow of a failure detection process in the communication control apparatus (router) according to the second embodiment.

As shown in FIG. 5, the router #a and the router #b operate an ICMP protocol (Internet Control Message Protocol) and mutually transmit an ICMP packet (S501 to S504).

More specifically, the router #a transmits an ICMP Echo request packet to the router #b through switching hubs #a to #c. The router #b which receives the ICMP Echo request packet transmits an ICMP Echo response packet to the router #a through the switching hubs #c to #a. Similarly, the router #b transmits the ICMP Echo request packet to the router #a, and the router #a transmits the ICMP Echo response packet to the router #b as a response to the request packet. In the above description, after the router #a transmits the ICMP Echo request packet to the router #b, the router #b transmits the ICMP Echo request packet to the router #a. However, the present invention is not limited to this configuration. Both the router #a and the router #b may simultaneously transmit ICMP Echo request packets.

Thereafter, when a failure occurs in the switching hub #b, the router #a cannot receive a response to the ICMP Echo request packet periodically transmitted to the router #b from the router #a (S505). Similarly, the router #b cannot receive a response to the ICMP Echo request packet periodically transmitted to the router #a from the router #b (S506). When the ICMP Echo response packet to the ICMP Echo request packet transmitted as described above cannot be received, the router #a and the router #b detect that a failure occurs in a sub-network (S507 and S508).

Effect by Second Embodiment

As described above, according to the second embodiment, an ICMP Echo request packet is transmitted to the router #a or the router #b which connects a sub-network and another network. When a response to the ICMP Echo packet is not received from a router serving as a destination, it is detected that a failure occurs in the sub-network. For this reason, a failure can be reliably detected.

For example, since an ICMP packet instead of an OSPF Hello packet is used, monitor time for a network, time-out time for receiving responses, and the like can be changed independently of an operation of the OSPF protocol. The ICMP is also used for a router which does not correspond to the OSPF to make it possible to detect a failure.

Third Embodiment

In the above description, the router #a and the router #b and the switching hubs #a to #c containing the sub-network are ordinary switching hubs in the first and second embodiments. However, the present invention is not limited to this configuration, and MAC learning switching hubs may also be used.

Therefore, in the third embodiment, a case in which a router #a and a router #b and switching hubs #a to #c containing a sub-network are MAC learning switching hubs will be described below. An entire configuration of a system including a communication control apparatus (router #b) according to the third embodiment, a procedure of a process in the communication control apparatus (router #b), and an effect of the third embodiment will be sequentially described below.

Entire Configuration (Third Embodiment) of Communication Control Apparatus (Router)

Figure 6:
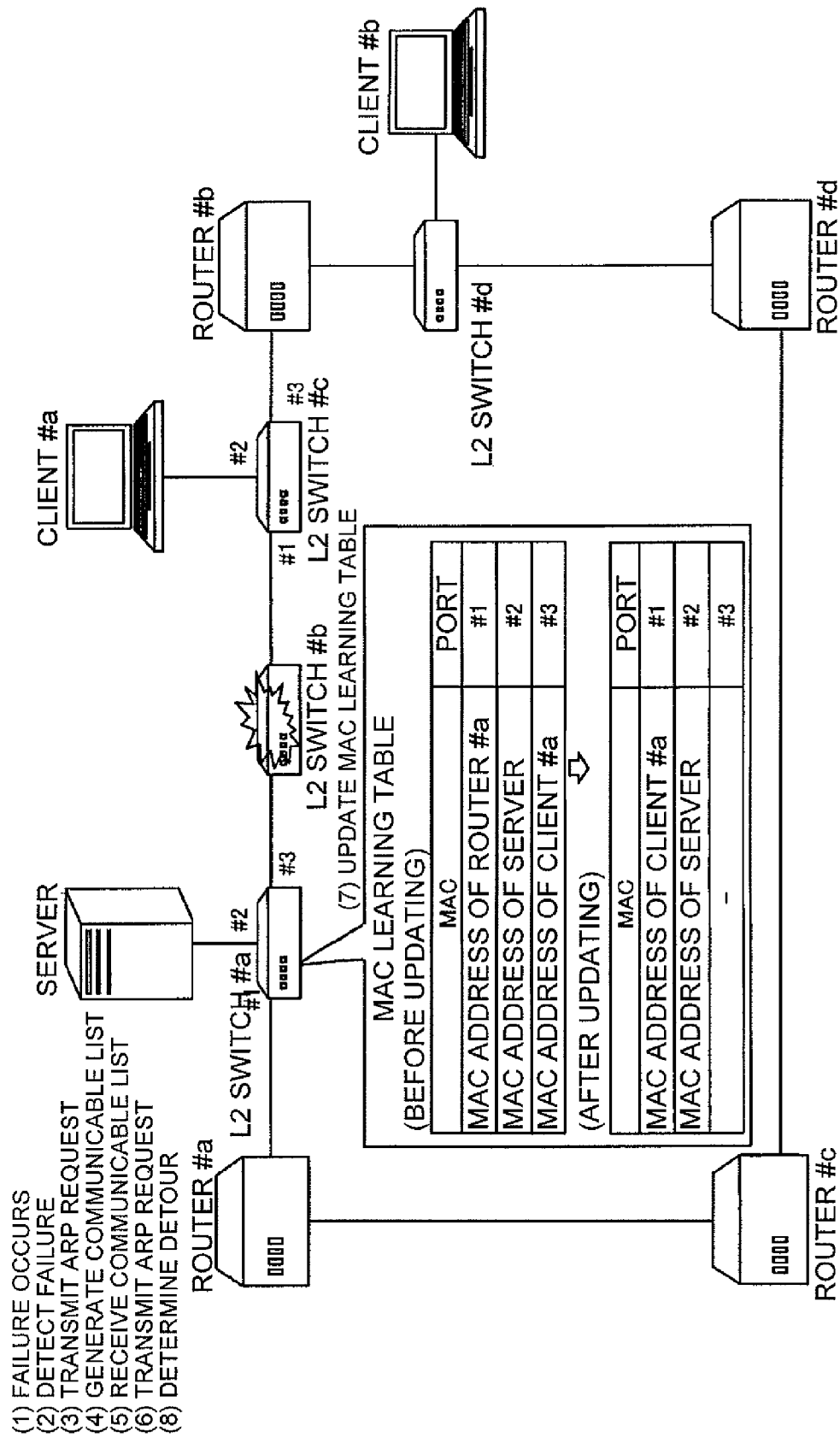
FIG. 6 is a diagram showing an entire configuration of a communication control apparatus (router) according to a third embodiment.

An entire configuration of the communication control apparatus (router) according to the third embodiment will be described below with reference to FIG. 6. FIG. 6 is a diagram showing the entire configuration of the communication control apparatus (router) according to the third embodiment.

As shown in FIG. 6, as in the first embodiment, a network contains a router #a, #b, and a router #a to a router #b, are mutually connected. A sub-network contains switching hub #a, #b and #c. A switching hub #a the server of which is connected to a port 2 and a switching hub #c the client #a of which is connected to the port 2, and a switching hub #b which connects the switching hub #a and the switching hub #c are connected between the router #a and the router #b.

The router #a and the router #b operate an OSPF protocol and mutually transmit an OSPF packet. The router #a and the router #b periodically receive OSPF Hello packets from the opposite routers to determine whether the sub-network between the router and the opposite router is in a normal communicable state.

The third embodiment is different from the first embodiment in that the switching hubs #a to #c are MAC learning switching hubs. To cite a concrete case, the switching hub #a has a MAC learning table in which a port number of a port connected to another apparatus and a MAC address of the other apparatus to be connected are stored in association with each other. For example, the switching hub #a stores, in the MAC learning table, as ""MAC" representing a MAC address and "port" representing a port to be connected", "MAC address of the router #a, #1", "MAC address of the server, #2", "MAC address of the client #a, #3", and the like.

In this configuration, the router #a transmits an OSPF packet to the router #b which connects the sub-network and another network. When the router #a does not receive a response to the OSPF packet from the router #b, the router #a detects that a failure occurs in the sub-network (see (1) and (2) in FIG. 6).

The router #a transmits ARP request packets to all addresses of the disconnected sub-network (see (3) in FIG. 6). The router #a generates a communicable list including a MAC address and an IP address of an apparatus with which the corresponding apparatus can communicate (see (4) in FIG. 6). The router #a transmits the communicable list to the router #b which connects the disconnected sub-network and other network, and the router #a receives a generated communicable list generated by the router #b (see (5) in FIG. 6).

More specifically, the router #a which detects the failure transmits ARP request packets to all host addresses (for example, 192.168.0.1 to 192.168.0.254 in a sub-network of 192.168.0.0/24). When the router #a receives an ARP response packet to the ARP request packet, the router #a generates a communicable list including a MAC address and an IP address on the basis of the ARP response packet. The router #a then transmits the generated communicable list to the router #b. In the router #b, a communicable list is generated in the same manner as that of the router #a and it is transmitted to the router #a. Then both routers store the received communicable lists as communicable lists for the corresponding apparatuses.

Subsequently, the router #a transmits an ARP request packet having a MAC address and an IP address in the received communicable list as a source address and a source IP address, respectively (see (6) in FIG. 6) to rewrite the MAC learning table (see (7) in FIG. 6), so that a detour is determined (see (8) in FIG. 6).

More specifically, the router #a transmits the ARP request packet having a MAC address and an IP address in the received communicable list (generated uncommunicable list) as a source address and an IP address, respectively to the switching hub #a. That is, at the router #a, the client #a is included the uncommunicable list. As a result, the ARP request packet using the MAC address and the IP address of the client #a is transmitted to the switching hub #a.

In the switching hub #a which receives the ARP request packet, the MAC leaning table related to the client #a is updated as "MAC address of the client #a, #1", "MAC address of the server, #2", and "-, #3" ('-' indicates or identifies port #3 of hub #a as incommunicable/disconnected). That is, a packet addressed to the MAC address of the client #a is transmitted from a port #1. As a result, the router #a can receive the packet addressed to the client #a from the server, and can transfer the packet through the routers #c, #d, and #b.

The router #a establishes tunneling to the detour determined as described above. Even in the router #b, by using the same method as described above, the MAC learning table of the switching hub #c can be rewritten, and a packet addressed to the server can be received from the client #a.

Process (Third Embodiment) by Communication Control Apparatus (Router #a)

Figure 7:
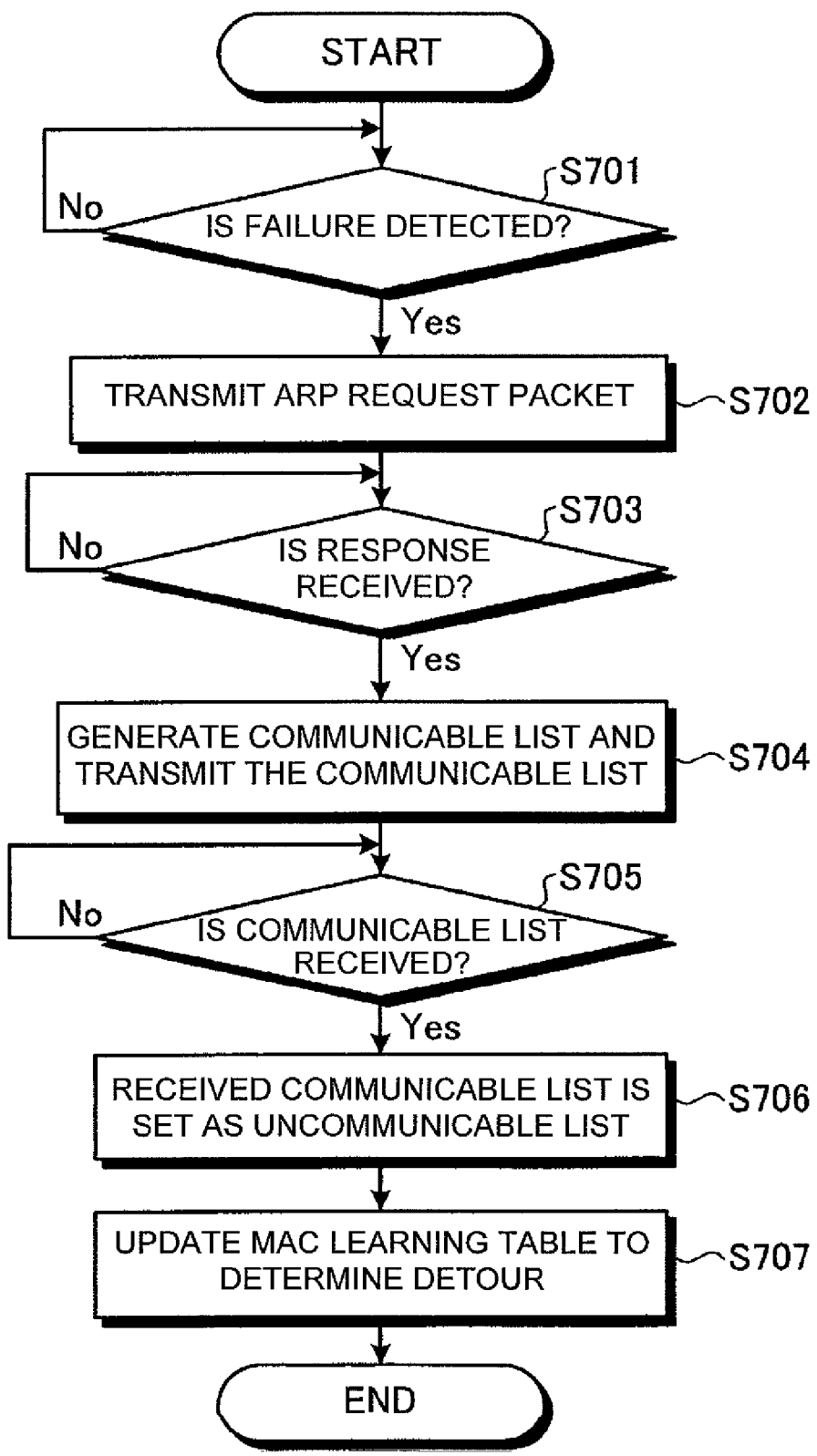
FIG. 7 is a flow chart showing a flow of a MAC learning table updating process in a communication control apparatus (router #a) according to the third embodiment.

A process by the communication control apparatus (router #a) will be described below with reference to FIG. 7. FIG. 7 is a flow chart showing a flow of a MAC learning table updating process in the communication control apparatus (router #a) according to the third embodiment.

When it is detected that a failure occurs in a sub-network (Yes in S701), the router #a transmits ARP request packets to all host addresses of a sub-network disconnected due to the failure (S702).

When the router #a receives an ARP response packet to the transmitted ARP request packet (Yes in S703), the router #a generates a communicable list on the basis of the ARP response packet to transmit the communicable list to the router #b (S704).

Thereafter, router #a receives the communicable list from the router #b (Yes in S705), and the router #a uses the received communicable list as an uncommunicable list (S706).

The router #a transmits an ARP request packet having a MAC address and an IP address in the generated uncommunicable list as a source address and a source IP address, respectively to the switching hub #a, so that the router #a updates the MAC learning table of the switching hub #a to determine a detour (S707). Thereafter, the router #a establishes tunneling to the determined detour.

Effect by Third Embodiment

In this manner, according to the third embodiment, an apparatus transmits ARP request packets to all addresses of a network disconnected due to a failure, generates a communicable list including a MAC address and an IP address of an apparatus with which the corresponding apparatus can communicate on the basis of a received response to the ARP packet, transmits the communicable list to a router which connects the disconnected network and another network, receives a communicable list generated by another router, and transmits an ARP request packet having a MAC address and an IP address in the received communicable list as a source address and a source IP address, respectively, to a switching hub to rewrite a MAC learning table, so that a detour is determined. For this reason, when the switching hub is a MAC learning switching hub having a MAC learning table in which a port number of a port connected to another apparatus and a MAC address of the other apparatus to be connected are stored in association with each other, the detour can be correctly assured.

For example, when a network disconnected due to a failure includes a learning switching hub, in general, even though a detour between routers which connect the networks is determined, communication with an apparatus connected to the learning switching hub becomes impossible. However, it is possible to correctly assure a detour to the apparatus connected to the learning switching hub by rewriting the learning table thereof.

Fourth Embodiment

The embodiments of the present invention have been described up to now. However, in addition to the embodiments described above, the present invention may be executed in various different configurations. Therefore, the different embodiments will be described below to be classified into (1) a failure detecting method, (2) tunneling, (3) advance determination of a detour, (4) advance establishment of tunneling, or any combinations thereof, (5) a system configuration or the like, and (6) a program. The embodiments may be implemented in computing hardware and/or software.

(1) Failure Detecting Method

For example, in the first to third embodiments, the case in which a failure is detected by an OSPF Hello packet or an ICMP Echo packet is described. However, the embodiments are not limited to the configuration. A failure may be detected by various protocols or visually checked. For example, a failure may be detected by using an RIP (Routing Information Protocol) or transmitting a unique packet.

(2) Tunneling

In the first and second embodiment, the case in which an L2 tunnel or an L3 tunnel is established in a determined detour is described. However, the embodiments are not limited to this configuration. Encoding communication may be performed in an IPsec (Security Architecture for Internet Protocol) or the like.

(3) Advance Determination of Detour

In the first to third embodiments, the case in which a detour is determined when a failure is detected is described. However, the embodiments are not limited to this configuration. A detour may be determined in advance. More specifically, before a failure is detected, a detour stored in advance as a detour to assure communication between an apparatus connected to a network disconnected due to a failure and another network. In this manner, the detour can be rapidly determined, and communication with the disconnected network can be assured.

For example, a predetermined detour is stored in advance. When a failure occurs in a network, tunneling is established by using the stored detour. As a result, in comparison with the case in which a detour is determined after a failure occurs, a detour can be rapidly determined, and communication to a disconnected network can be assured.

Advance Establishment of Tunneling

In the first and second embodiments, the case in which tunneling is established after a detour is determined is described. However, the embodiments are not limited to this configuration. Tunneling may be established in advance. More specifically, a detour to assure communication between an apparatus connected to a sub-network and another network is determined. By a designation from a user, tunneling serving as a virtual direct communication circuit is established in advance to the determined detour. In this manner, when a failure occurs in the network, the detour can be rapidly determined to make it possible to establish communication.

For example, in a case that, by a designation of a user, a detour is determined in advance to establish tunneling, when a network failure occurs, it requires only to switch from a normal communication route to the detour established in advance to make it possible to assure communication. As a result, a detour can be rapidly assured to make it possible to establish communication.

(5) System Configuration or the Like

The constituent elements of the each apparatus shown in the drawings are functionally conceptual, and the apparatuses are not always physically constituted by the elements shown in the drawings. More specifically, a concrete configuration of distribution and integration of the apparatuses are not limited to the configuration shown in the drawings. All or some of the constituent elements can be functionally or physically distributed and integrated (for example, a detour determination unit and a tunneling establishing unit are integrated with each other) depending on various loads or various operating situations. Furthermore, all processing functions performed by the apparatuses or arbitrary processing functions are realized by a CPU and a program analyzed and executed by the CPU. Alternatively, the processing functions can be realized as hardware based on a wired logic.

Of the processes described in the embodiment, all or some of the processes (for example, a routing process, a response process to a packet, and the like) described as processes to be automatically performed can also be manually performed. Alternatively, all or some of processes (for example, failure detection by visual check) described as processes to be manually performed can also be automatically performed. In addition, information (for example, a routing table, a MAC learning table, and the like) including process procedures, control procedures, concrete names, various data, and parameters shown in the documents or drawings can be arbitrarily changed except unless otherwise noted.

(6) Program

The various processes described in the embodiments can be realized by executing a program prepared in advance by a computer system such as a personal computer or a workstation. Therefore, a computer system which executes a program having the same functions as those of the embodiment will be described below as another embodiment.

Figure 8:
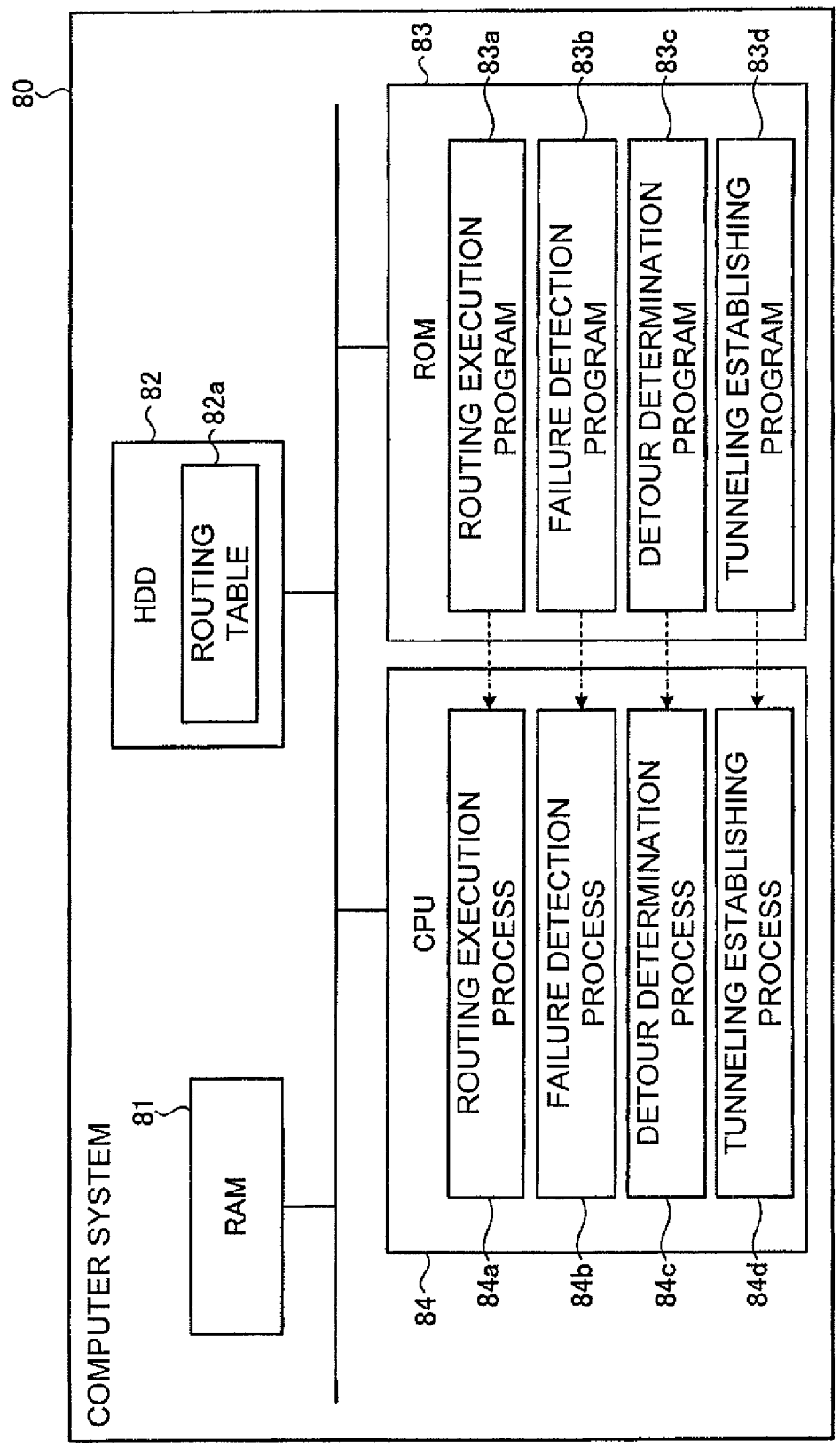
FIG. 8 is a diagram showing an example of a computer system which executes a communication control program according to an embodiment.

FIG. 8 is a diagram showing an example of a computer system which executes a communication control program implementing a router and/or a switching hub according to the embodiments. As shown in FIG. 8, a computer system 80 has a RAM 81, an HDD 82, a ROM 83, and a CPU 84. In this case, in the ROM 83, a program which achieves the same functions as those in the above embodiments, i.e., as shown in FIG. 8, a routing execution program 83*a*, a failure detection program 83*b*, a detour determination program 83*c*, and a tunneling establishing program 83*d* are stored in advance.

The CPU 84 reads and executes the programs 83*a* to 83*d*, as shown in FIG. 8, to be a routing execution process 84*a*, a failure detection process 84*b*, a detour determination process 84*c*, and a tunneling establishing process 84*d*, respectively. The routing execution process 84*a* corresponds to the routing execution unit 16 shown in FIG. 3, the failure detection process 84*b* corresponds to the failure detection unit 17, the detour determination process 84*c* corresponds to the detour determination unit 18, and the tunneling establishing process 84*d* corresponds to the tunneling establishing unit 19.

On the HDD 82, a routing table 82*a* which stores route information in a router is set. The routing table 82*a* corresponds to the routing table 13 shown in FIG. 3.

The routing execution program 83*a* is not necessarily stored in the ROM 83. For example, the routing execution program 83*a* may be stored in a "portable physical medium" such as a flexible disk (FD), a CD-ROM, an MO disk, a DVD disk, a magnetooptical disk, or an IC card to be inserted into the computer system 80, a "fixed physical medium" such as a hard disk drive (HDD) arranged outside or inside the computer system 80, or "another computer system" connected to the computer system 80 through a public line, the Internet, a LAN, a WAN, and the like, and the computer system 80 may read the program from these media and executed.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer readable recording medium which records a communication control program which causes a computer to execute a method of communicably connecting a network including a data relay apparatus to other network according to operations comprising:

configuring the data relay apparatus as a MAC learning data relay apparatus by having a Media Access Control (MAC) learning table in which a port number of a port connected to another apparatus and a MAC address of the other apparatus are stored in association with each other;

detecting a failure occurring in the network as a disconnected network;

determining a communication detour assuring communication between an apparatus that is connected to the disconnected network and the other network by updating the MAC learning table of the data relay apparatus based upon transmitting an ARP request packet to addresses of the disconnected network; and establishing tunneling serving as a virtual direct communication circuit according to the determined communication detour.

2. The computer readable recording medium which records the communication control program according to claim 1, wherein the detecting of the failure comprises:

transmitting an OSPF packet or an ICMP packet to a communication control apparatus connecting the network and the other network, and detecting occurrence of the failure in the network when responses to the OSPF packet or the ICMP packet are not received from the communication control apparatus.

3. The computer readable recording medium which records the communication control program according to claim 1, wherein the communication detour is determined based upon a routing table calculated by an SPF tree in an OSPF protocol.

4. The computer readable recording medium which records the communication control program according to claim 1, wherein the operations of the computer further comprise:

transmitting an ARP request packet to all addresses of the disconnected network, generating based upon a received response to the ARP request packet, a communicable list including a MAC address and an IP address of an apparatus with which the data relay apparatus communicates, transmitting the communicable list to a communication control apparatus which connects the disconnected network and the other network, receiving a communicable list generated by the communication control apparatus, and rewriting the MAC learning table in the data relay apparatus for updating the MAC learning table by transmitting an ARP request packet having a MAC address and an IP address of the communicable list as a source address and a source IP address, respectively, to the data relay apparatus.

5. The computer readable recording medium which records the communication control program according to claim 1, wherein the communication detour is determined based upon a communication detour stored in advance before the detecting of the failure.

6. The computer readable recording medium which records the communication control program according to claim 1, wherein the tunneling is established in advance to the determined communication detour.

7. The computer readable recording medium which records the communication control program according to any one of claims 1, wherein the established tunneling is a layer 2 serving as a data link layer or a layer 3 serving as a network layer as the virtual direct communication circuit.

8. A communication control apparatus which communicably connects a network including a data relay apparatus to another network, comprising:

a computer processor configuring the data relay apparatus as a MAC learning data relay apparatus by having a Media Access Control (MAC) learning table in which a port number of a port connected to another apparatus and a MAC address of the other apparatus are stored in association with each other;

detecting a failure occurring in the network as a disconnected network;

determining a communication detour assuring communication between an apparatus that is connected to the disconnected network and the other network by updating the MAC learning table of the data relay apparatus based upon transmitting an ARP request packet to addresses of the disconnected network; and establishing tunneling serving as a virtual direct communication circuit according to the determined communication detour.

9. A method of controlling communication between a network including a data relay apparatus and another network, comprising:

configuring the data relay apparatus as a MAC learning data relay apparatus by having a Media Access Control (MAC) learning table in which a port number of a port connected to another apparatus and a MAC address of the other apparatus are stored in association with each other;

using a computer detecting a failure occurring in the network as a disconnected network;

determining a communication detour assuring communication between an apparatus that is connected to the disconnected network due to the detected failure and the other network by updating the MAC learning table of the data relay apparatus based upon transmitting an ARP request packet to addresses of the disconnected network; and establishing tunneling serving as a virtual direct communication circuit according to the determined communication detour determined.

* * * * *

UNITED STATES PATENT AND TRADEMARK OFFICE
CERTIFICATE OF CORRECTION

| | | |
|---|---|---|
| PATENT NO. | : 7,864,666 B2 | Page 1 of 1 |
| APPLICATION NO. | : 11/970973 | |
| DATED | : January 4, 2011 | |
| INVENTOR(S) | : Tooru Enoki et al. | |

It is certified that error appears in the above-identified patent and that said Letters Patent is hereby corrected as shown below:

On the Title Page, insert the following item:
--(30) Foreign Application Priority Data
JP 2007-005179  January 12, 2007--.

In Column 14, Lines 36 and 37, delete "according to any one of claims 1" and insert --according to claim 1-- therefor.

Signed and Sealed this
Twenty-fifth Day of October, 2011

David J. Kappos
*Director of the United States Patent and Trademark Office*